US009527419B2

(12) United States Patent
Hosbach et al.

(10) Patent No.: US 9,527,419 B2
(45) Date of Patent: *Dec. 27, 2016

(54) VEHICLE SEATING ASSEMBLY WITH MANUAL CUSHION TILT

(71) Applicant: Ford Global Technologies, LLC, Dearborn, MI (US)

(72) Inventors: Christian J. Hosbach, Allen Park, MI (US); Brandon W. Nichols, Ann Arbor, MI (US); Johnathan Andrew Line, Northville, MI (US); Mandeep Singh Sidhu, Canton, MI (US); Jason William Nisbett, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/230,961

(22) Filed: Mar. 31, 2014

(65) Prior Publication Data

US 2015/0274050 A1    Oct. 1, 2015

(51) Int. Cl.
*B60N 2/62*     (2006.01)
*B60N 2/02*     (2006.01)

(52) U.S. Cl.
CPC .. *B60N 2/62* (2013.01); *B60N 2/02* (2013.01)

(58) Field of Classification Search
CPC ........................................................ B60N 2/62
USPC ........................................ 297/284.11, 423.26
See application file for complete search history.

(56) References Cited

U.S. PATENT DOCUMENTS

| 2,958,369 | A |   | 11/1960 | Pitts et al. |
|-----------|---|---|---------|--------------|
| 3,403,938 | A |   | 10/1968 | Cramer et al. |
| 3,883,173 | A | * | 5/1975  | Shephard ................. B60N 2/62 297/201 |
| 3,929,374 | A |   | 12/1975 | Hogan et al. |
| 4,324,431 | A |   | 4/1982  | Murphy et al. |
| 4,334,709 | A |   | 6/1982  | Akiyama et al. |

(Continued)

FOREIGN PATENT DOCUMENTS

| DE |     2027646 A1 * | 1/1971 | ............... B60N 2/10 |
|----|------------------|--------|--------------------------|
| DE | 202011002085 U1 * | 4/2011 | ............... B60N 2/62 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Ryan Kwiecinski
(74) *Attorney, Agent, or Firm* — Vichit Chea; Price Heneveld LLP

(57) ABSTRACT

A vehicle seating assembly includes a seat base. A thigh support is pivotally coupled to and extends forward from the seat base. The thigh support is spring-biased relative to the seat base to a raised position. A lever is operably coupled to a center portion of the thigh support by a hinge. The lever is spring-biased to a raised position relative to the thigh support and includes a rack with a plurality of teeth proximate the hinge. The teeth of the rack are configured to engage a catch projecting from the seat base. A handle extends transversely from the lever. The handle is operable to disengage the rack from the catch.

19 Claims, 9 Drawing Sheets

(56) References Cited

U.S. PATENT DOCUMENTS

| | | | |
|---|---|---|---|
| 4,353,595 A | 10/1982 | Kaneko et al. | |
| 4,541,669 A | 9/1985 | Goldner | |
| 4,629,248 A * | 12/1986 | Mawbey | B60N 2/62 297/284.11 |
| 4,652,049 A * | 3/1987 | Maruyama | A47C 7/14 297/284.11 |
| 4,664,444 A | 5/1987 | Murphy | |
| 4,693,513 A * | 9/1987 | Heath | B60N 2/1839 297/284.11 |
| 4,720,141 A | 1/1988 | Sakamoto et al. | |
| 4,775,185 A * | 10/1988 | Scholin | B60N 2/62 297/284.11 |
| 4,915,447 A * | 4/1990 | Shovar | B60N 2/0284 297/284.11 |
| 5,080,433 A * | 1/1992 | Hayden | B60N 2/62 297/423.32 |
| 5,171,062 A | 12/1992 | Courtois | |
| 5,174,526 A | 12/1992 | Kanigowski | |
| 5,362,128 A * | 11/1994 | Wildern, IV | B60N 2/62 297/284.11 |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,357,827 B1 | 3/2002 | Brightbill et al. | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,350,865 B2 | 4/2008 | Pearse | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,100,471 B2 * | 1/2012 | Lawall | B60N 2/42763 297/216.1 |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0109401 A1 * | 5/2010 | Booth | B60N 2/62 297/284.11 |
| 2010/0140986 A1 | 6/2010 | Sawada | |
| 2010/0171346 A1 | 7/2010 | Laframboise et al. | |
| 2010/0187881 A1 | 7/2010 | Fujita et al. | |

(56) References Cited

U.S. PATENT DOCUMENTS

| | | |
|---|---|---|
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0006573 A1* | 1/2011 | Arakawa ............ B60N 2/0232 297/284.11 |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0049597 A1 | 3/2012 | Brewer et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2014/0203617 A1* | 7/2014 | Line ............... B60N 2/4495 297/423.29 |
| 2015/0108816 A1* | 4/2015 | Dry ............... B60N 2/62 297/423.19 |

FOREIGN PATENT DOCUMENTS

| | | | |
|---|---|---|---|
| EP | 0754590 | 1/1997 | |
| EP | 0926969 | 1/2002 | |
| EP | 1266794 | 3/2004 | |
| EP | 1123834 | 10/2004 | |
| EP | 1050429 | 10/2005 | |
| EP | 1084901 | 6/2006 | |
| EP | 1674333 | 8/2007 | |
| EP | 1950085 | 12/2008 | |
| EP | 1329356 | 11/2009 | |
| FR | 2562003 A1 * | 10/1985 | ............... B60N 2/62 |
| JP | WO 2009063777 A1 * | 5/2009 | ............ B60N 2/161 |
| JP | 201178557 A | 4/2011 | |
| WO | WO9511818 | 5/1995 | |
| WO | WO9958022 | 11/1999 | |
| WO | WO2006131189 | 12/2006 | |
| WO | WO2007028015 | 8/2007 | |
| WO | 2008019981 A1 | 2/2008 | |
| WO | WO2008073285 | 6/2008 | |
| WO | WO2011021952 | 2/2011 | |
| WO | WO2012008904 | 1/2012 | |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

Ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

VEHICLE SEATING ASSEMBLY WITH MANUAL CUSHION TILT

FIELD

The present disclosure generally relates to a vehicle seating assembly, and more particularly to a vehicle seating assembly having a manual cushion tilt.

BACKGROUND

Modern vehicle seats are becoming more and more comfortable as our understanding of human ergonomics, posture, and comfortability increases. Vehicle seating assemblies that include comfort components in the vehicle seat back and the vehicle seat can provide drivers and passengers with improved comfort and increased endurance for extensive vehicle rides. Additionally, accommodating the various sizes, shapes, and desired sitting style of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY

According to one aspect of the present disclosure, a vehicle seating assembly includes a seat base. A thigh support is pivotally coupled to and extends forward from the seat base. The thigh support is spring-biased relative to the seat base to a raised position. A lever is operably coupled to a center portion of the thigh support by a hinge. The lever is spring-biased to a raised position relative to the thigh support and includes a rack with a plurality of teeth proximate the hinge. The teeth of the rack are configured to engage a catch projecting from the seat base. A handle extends transversely from the lever. The handle is operable to disengage the rack from the catch.

According to another aspect of the present disclosure, a vehicle seating assembly includes a forward thigh support pivotally coupled to a seat base. A lever is coupled to the thigh support via a hinge and having a plurality of teeth. First and second catch members project downward from the seat base and engaged with the teeth. Spring members are disposed on the hinge that bias the lever to a raised position. A handle is operable to disengage the teeth from the catch members.

According to yet another aspect of the present disclosure, a vehicle seating assembly includes a seat base. A forward thigh support is pivotally coupled to the seat base. The thigh support is spring-biased to a raised position. A lever is hingedly coupled to the thigh support and spring-biased to a raised position. The lever includes teeth engaged with a catch projecting from the seat base. A handle extends from the lever and is operable to disengage the teeth from the catch.

According to still another aspect of the present disclosure, a vehicle seating assembly includes a seat with a seat base. The seat is configured to provide independent support to each leg of a passenger by utilization of independent thigh supports located in front of the seat base. The independent thigh supports are biased to a raised position by spring members and are rotatable relative to the seat base.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
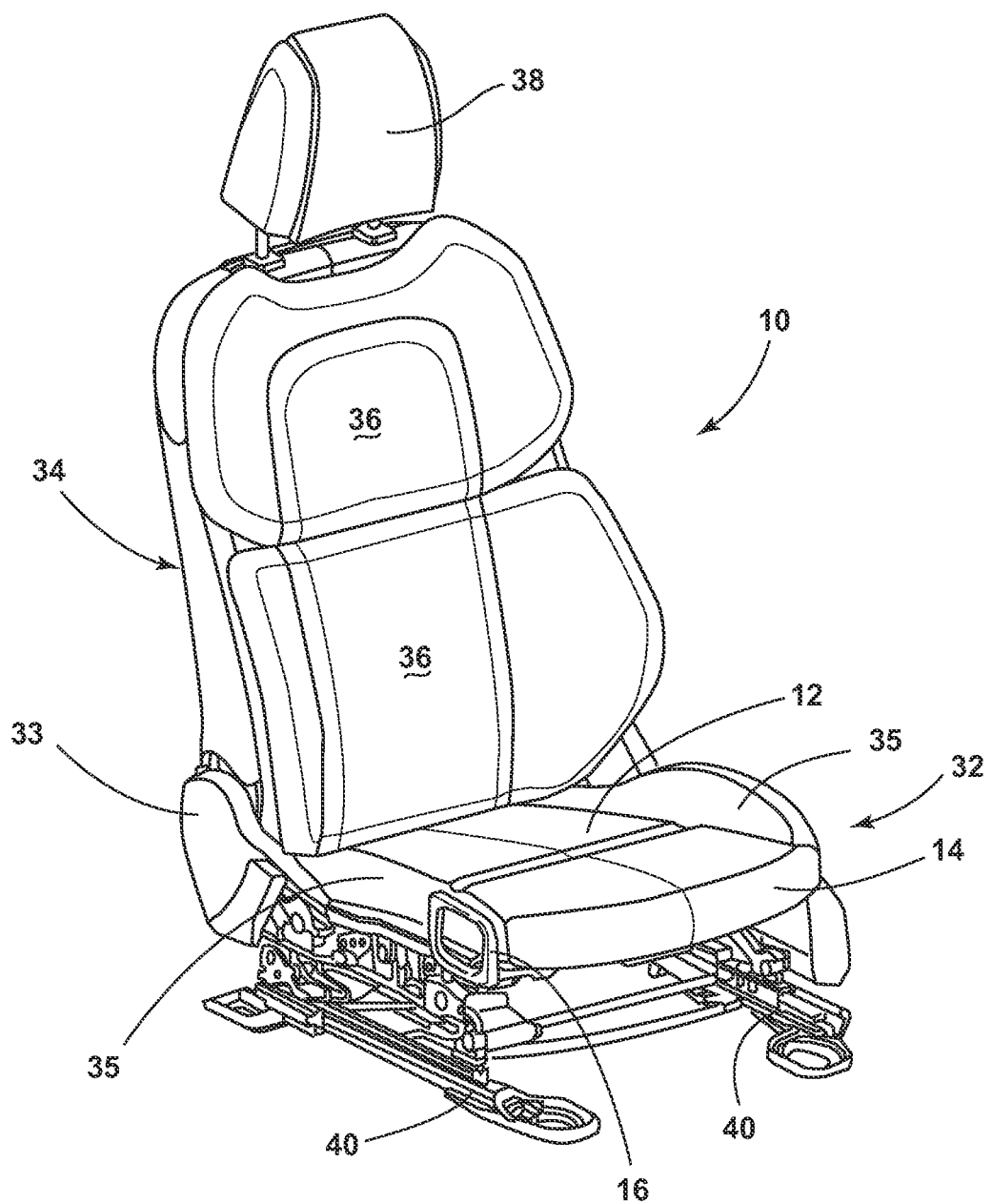
FIG. 1 is a front perspective view of one embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments shown in FIGS. 1-9, reference numeral 10 generally designates a vehicle seating assembly having a seat base 12. A thigh support 14 is pivotally coupled to and extends forward from the seat base 12. The thigh support 14 is spring-biased relative to the seat base 12 to a raised position. A lever 16 is operably coupled to a center portion of the thigh support 14 by a hinge 20. The lever 16 is spring-biased to a raised position relative to the thigh support 14 and includes a rack 22 with a plurality of teeth 24 proximate the hinge 20. The plurality of teeth 24 of the rack 22 are configured to engage a catch 26 projecting downward from the thigh support 14. A handle 30 extends transversely from the lever 16. The handle 30 is operable to disengage the rack 22 from the catch 26.

With reference again to FIG. 1, the vehicle seating assembly 10 includes a seat 32 and a seatback 34 disposed above the seat 32. The seatback 34 is generally configured to pivot about a recliner heart 33 relative to the seat 32 to accommodate passengers. In the illustrated embodiment, the seat 32 includes the seat base 12 and the thigh support 14, as well as side bolsters 35. However, it is contemplated that the seat 32 can include other features and configurations. A cushion assembly 36 is disposed on each of the seat base 12 and the thigh support 14. The cushion assembly 36 is also disposed over the thigh support 14 to provide comfort to a passenger. Similarly, the seatback 34 includes cushion assemblies 36 configured to comfort passengers seated thereon. The seatback 34 also includes an upper headrest or head restraint 38 designed to provide support to the head of a passenger during normal travel and also during a collision event. The headrest 38 may be manually adjustable or adjustable via a motorized system. It is also contemplated that the seat 32 and the seatback 34 may include a flexible system or have individual adjustability to each part of the seat 32 and the seatback 34. The vehicle seating assembly 10 that is illustrated in FIG. 1 is disposed on a rail slide assembly 40 configured to allow linear movement of the vehicle seating assembly 10 forward and rearward relative to the vehicle. In addition, the entire vehicle seating assembly 10 may be manually adjustable, or adjustable via a motorized system designed to move the vehicle seating assembly 10 forward and rearward and also upward and downward.

Figure 2:
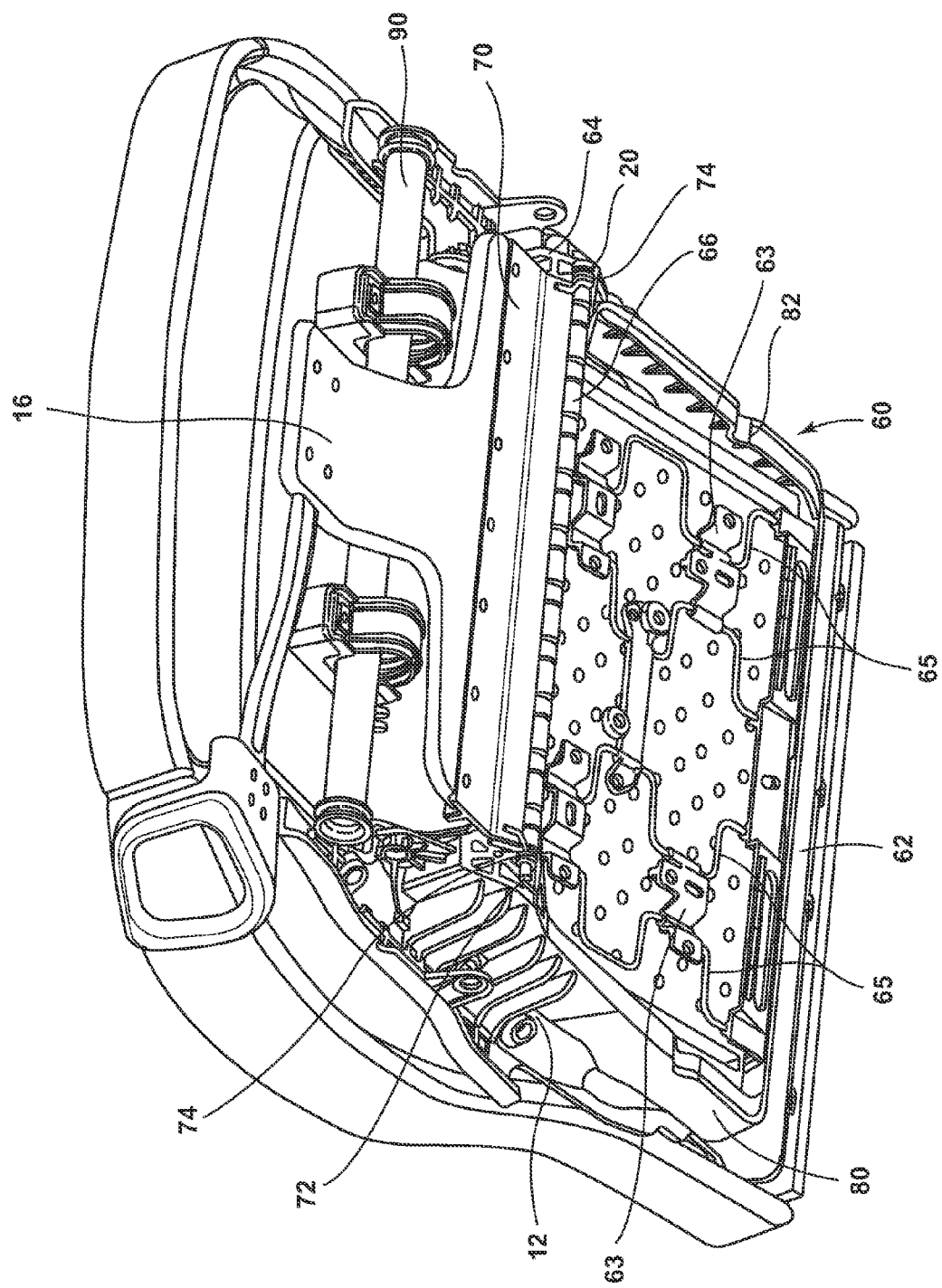
FIG. 2 is a bottom perspective view of the vehicle seating assembly of FIG. 1.
Figure 3:
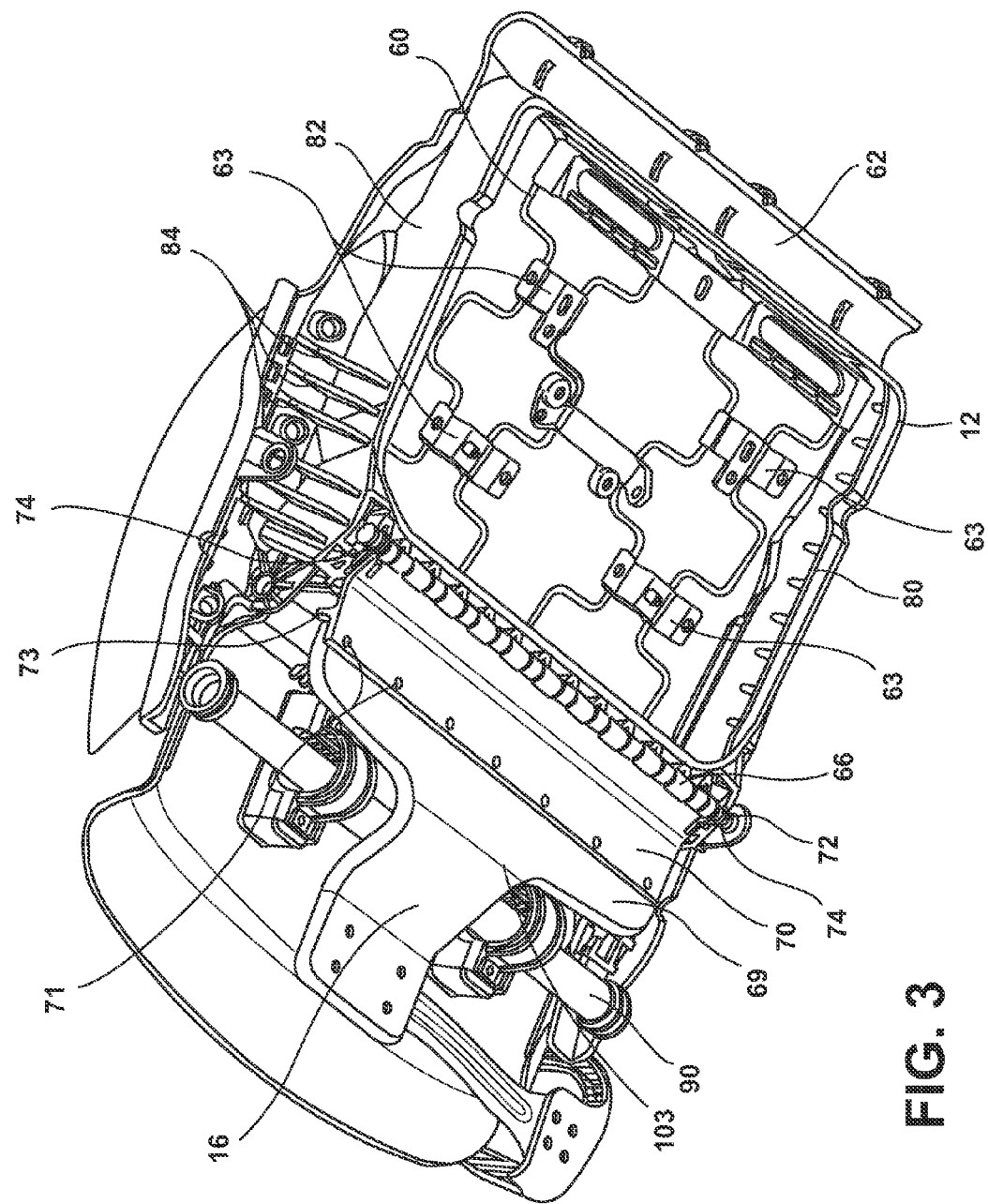
FIG. 3 is another bottom perspective view of the vehicle seating assembly of FIG. 1.

With reference now to FIG. 2, the seat base 12 includes a spring assembly 60 operably coupled between a rearward portion 62 of the seat base 12 and a forward portion 64 of the seat base 12. In the illustrated embodiment, the spring assembly 60 includes a plurality of flex members 65 that are operably coupled with the rearward portion 62 and the forward portion 64. The spring assembly 60 flexibly supports one of the cushion assemblies 36 via securing brackets 63. The forward portion 64 of the seat base 12 includes a hinge 66. In the illustrated embodiment, a piano-type hinge mechanism 66 is utilized. In one embodiment, the teeth 24 of the rack 22 extend across a bottom of the seat 32 a distance approximately equal to the hinge 66. A rearward flange 68 (FIG. 5) of the piano-type hinge mechanism 66 is fastened to the forward portion 64 of the seat base 12 and a forward flange 70 is operably coupled to a widened rear portion 69 of the lever 16. In the illustrated embodiment, the forward flange 70 is operably coupled to the lever 16 by fasteners 71. The forward flange 70 includes a stop 73 configured to positively position the widened rear portion 69 relative to the forward flange 70. The stop 73 also limits over rotation of the catch 26. The piano-type hinge mechanism 66 includes a hinge pin 72. Each end of the hinge pin 72 includes a spring member 74 configured to bias the forward flange 70, and ultimately the lever 16 upward.

With reference again to FIGS. 2 and 3, the seat base 12 includes first and second side members 80, 82 that together with the rearward and forward portions 62, 64 of the seat base 12 define a generally rigid structure. Each of the first and second side members 80, 82 includes a plurality of outwardly extending support flanges 84 designed to provide even further structural support to the seat base 12.

Figure 4:
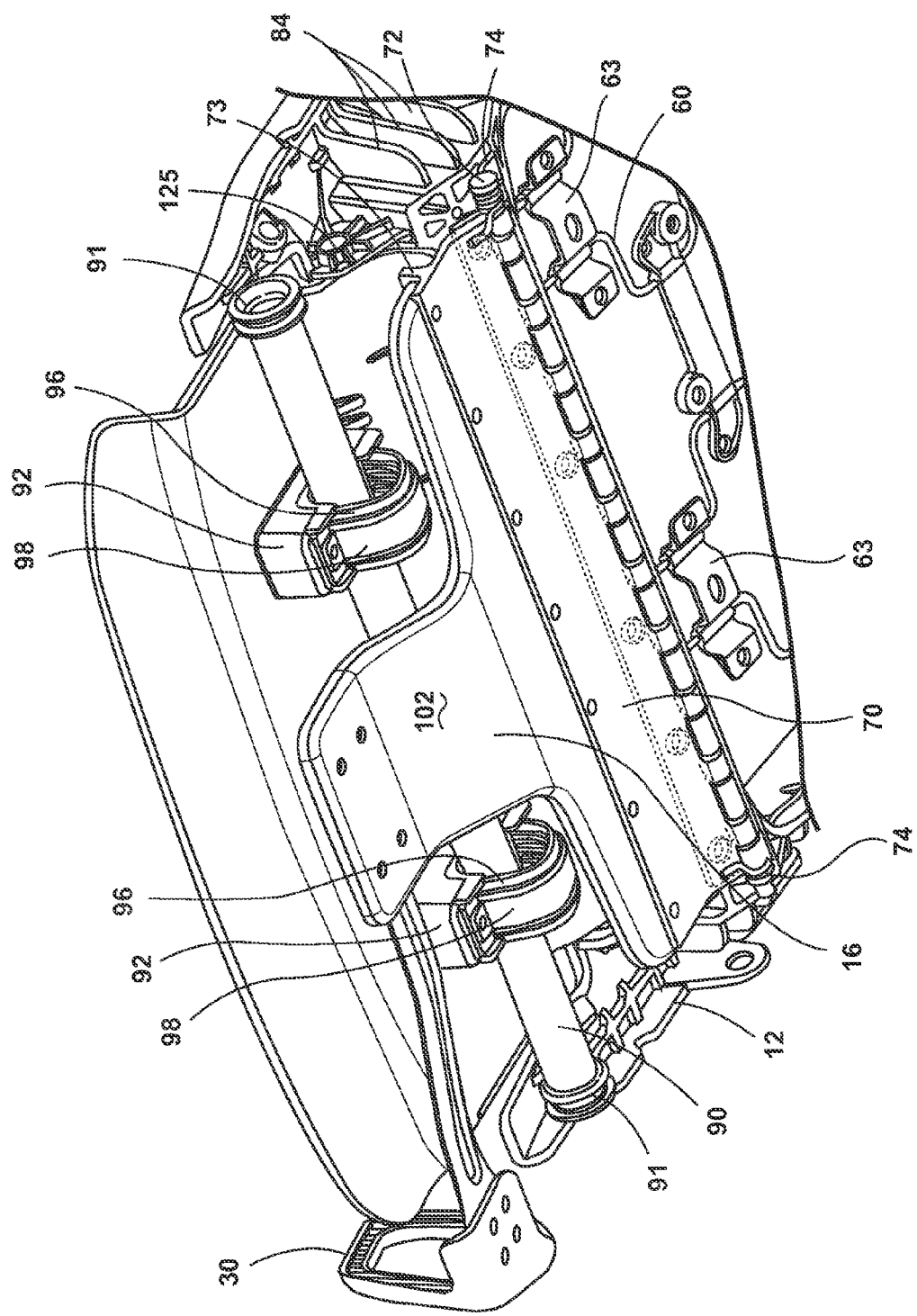
FIG. 4 is a partial front bottom perspective view of the vehicle seating assembly of FIG. 1.
Figure 5:
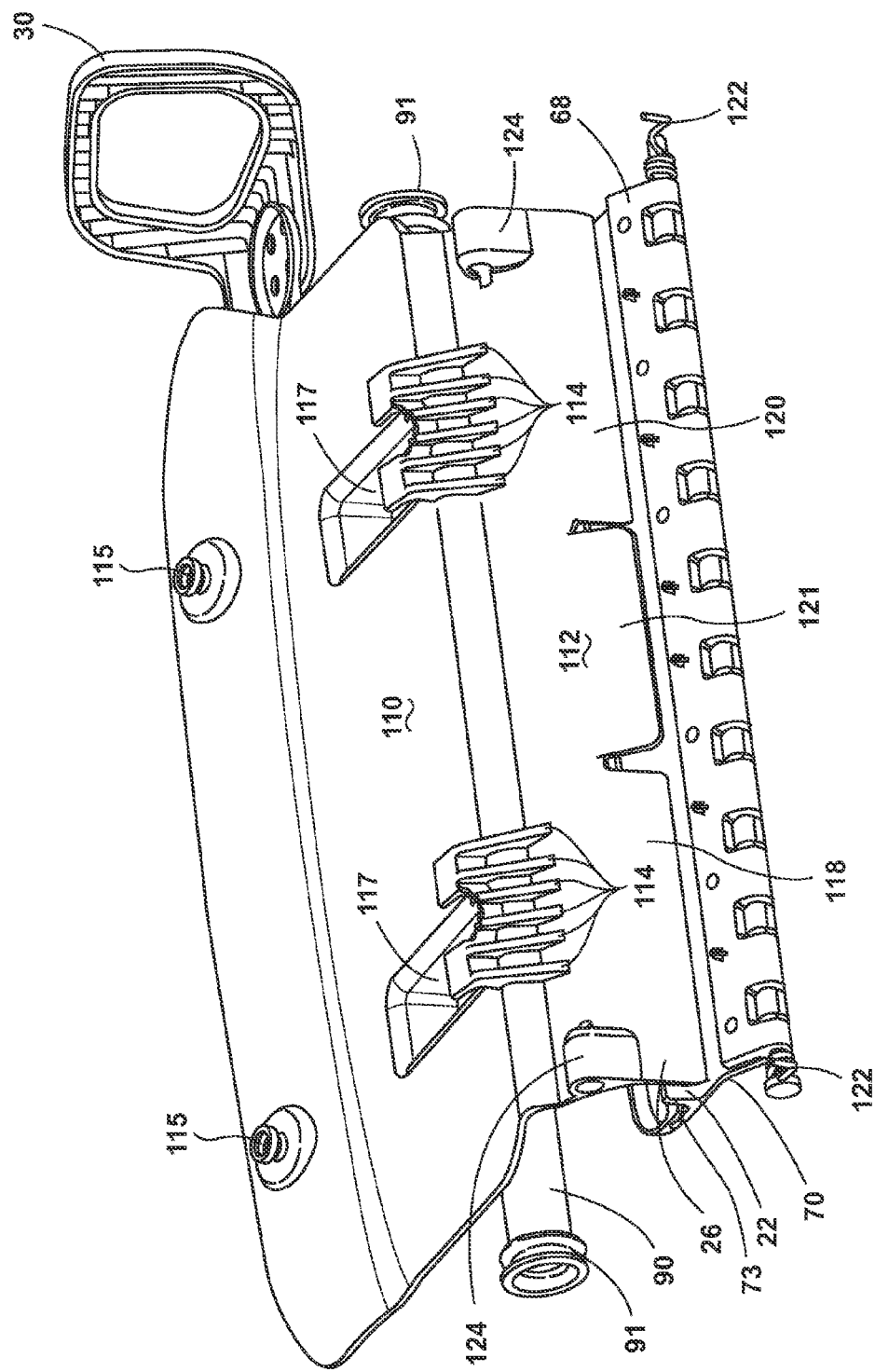
FIG. 5 is a rear top perspective view of one embodiment of a portion of a thigh support of a vehicle seating assembly.

With reference to FIGS. 4 and 5, a support rod 90 extends laterally across the seat 32 below the thigh support 14. An end cap 91 is disposed on each end of the support rod 90. The thigh support 14 is operably coupled with the support rod 90 via braces 92 and gaskets 96 that are secured to the braces 92 by rigid bracket members 98. The braces 92 and the bracket members 98 each define an enlarged opening 100 through which the support rod 90 extends. Notably, the enlarged opening 100 is larger than an outer diameter of the support rod 90, thereby allowing for movement of the support rod 90 relative to the thigh support 14. The lever 16 extends forward relative to the piano-type hinge mechanism 66 between the braces 92 and the bracket members 98. The lever 16 includes the widened rear portion 69, a narrow forward portion 102, and an angled transitional portion 103 connecting the widened rear portion 69 and the forward portion 102. The narrow forward portion 102 of the lever 16 is disposed below the thigh support 14 and configured for adjustment by the handle 30 as disclosed in further detail herein.

Figure 6:
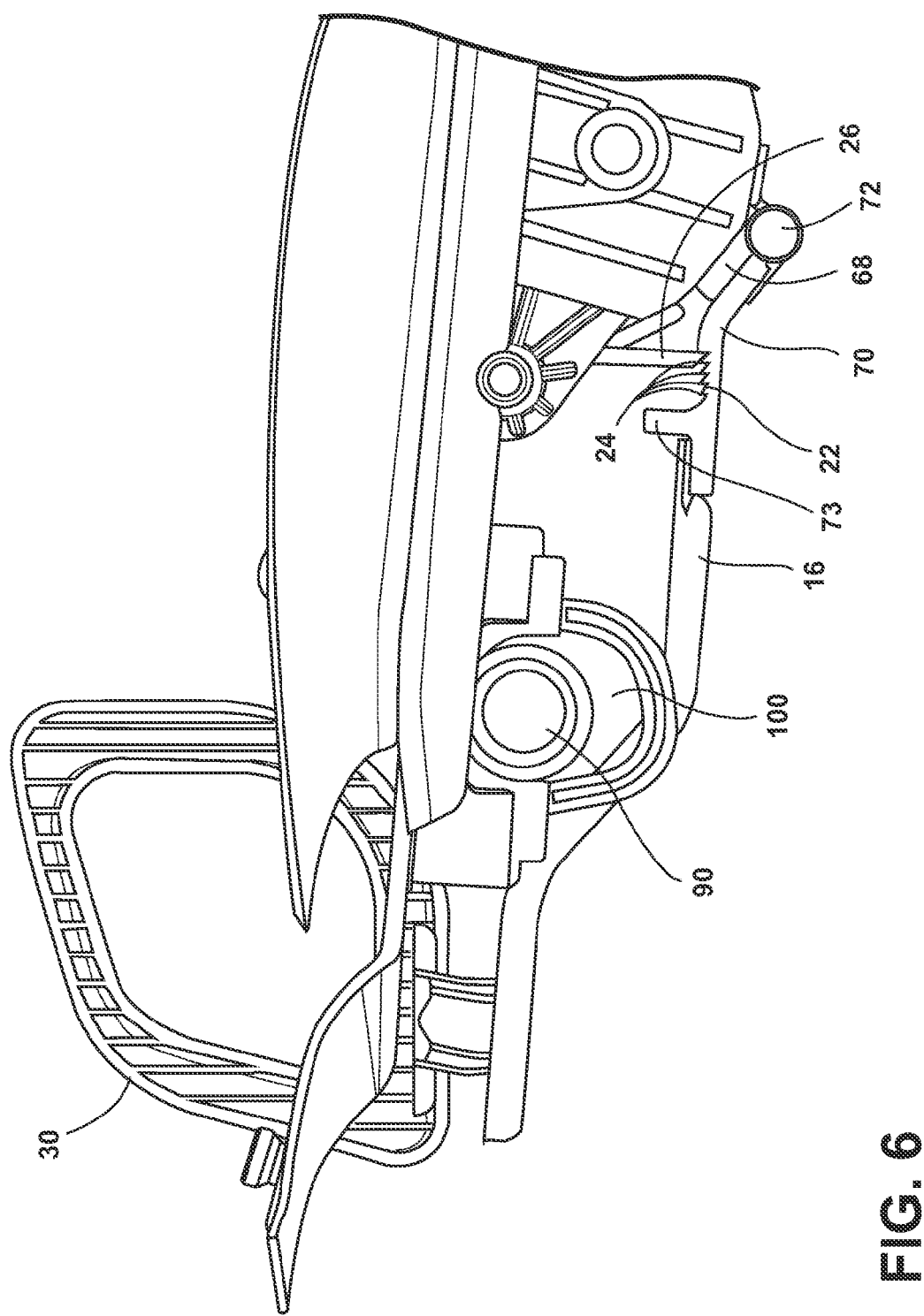
FIG. 6 is a side elevational view of the thigh support of FIG. 5.

With reference now to FIGS. 5 and 6, the thigh support 14 includes a lateral portion 110 configured to support the legs of a passenger and a vertical portion 112 that extends downwardly from the lateral portion 110. The thigh support 14 includes reinforcement members 114 designed to provide structural rigidity to the thigh support 14 and also configured to support one of the cushion assemblies 36 above the thigh support 14, providing additional comfort to a passenger. The cushion assembly 36 is coupled to the thigh support 14 by snap-fit connectors 115. Cavities 117 are defined in the thigh support 14 in front of the reinforcement members 114. The handle 30 extends laterally to one side of the thigh support 14. However, it is contemplated that the handle 30 could extend in front of the thigh support 14, on either side of the thigh support 14, or adjacent to the seat base 12 rearwardly from the thigh support 14.

In addition, notably, the vertical portion 112 of the thigh support 14 includes first and second engagement members 118, 120, which together define the catch 26. The first and second engagement members 118, 120 are configured to interface with, and more specifically, engage with the teeth 24 of the rack 22. The first and second engagement members 118, 120 are separated by an intermediate offset portion 121 that does not engage with the teeth 24 of the rack 22. The lever 16 is spring-biased to a raised position relative to the thigh support 14. As is discussed in further detail herein, the lever 16 is movable relative to the thigh support 14. The spring members 74 are operably coupled with the hinge pin 72 and bias the forward flange 70 to a raised position. At the same time, the spring members 74 push the rack 22 into secure engagement with the catch 26. Application of force on the handle 30 in a downward direction moves the rack 22 out of engagement with the catch 26. Although the spring members 74 are shown wrapped around the hinge pin 72, it will be understood that the spring members 74 could take on other configurations and could be coil springs, leaf springs, etc. Notably, the thigh support 14 rotates about pivot members 124. The pivot members 124 include biasing members that bias the thigh support 14 to the raised position. The pivot members 124 are aligned with pivot holes 125 on the first and second side members 80, 82.

Figure 7:
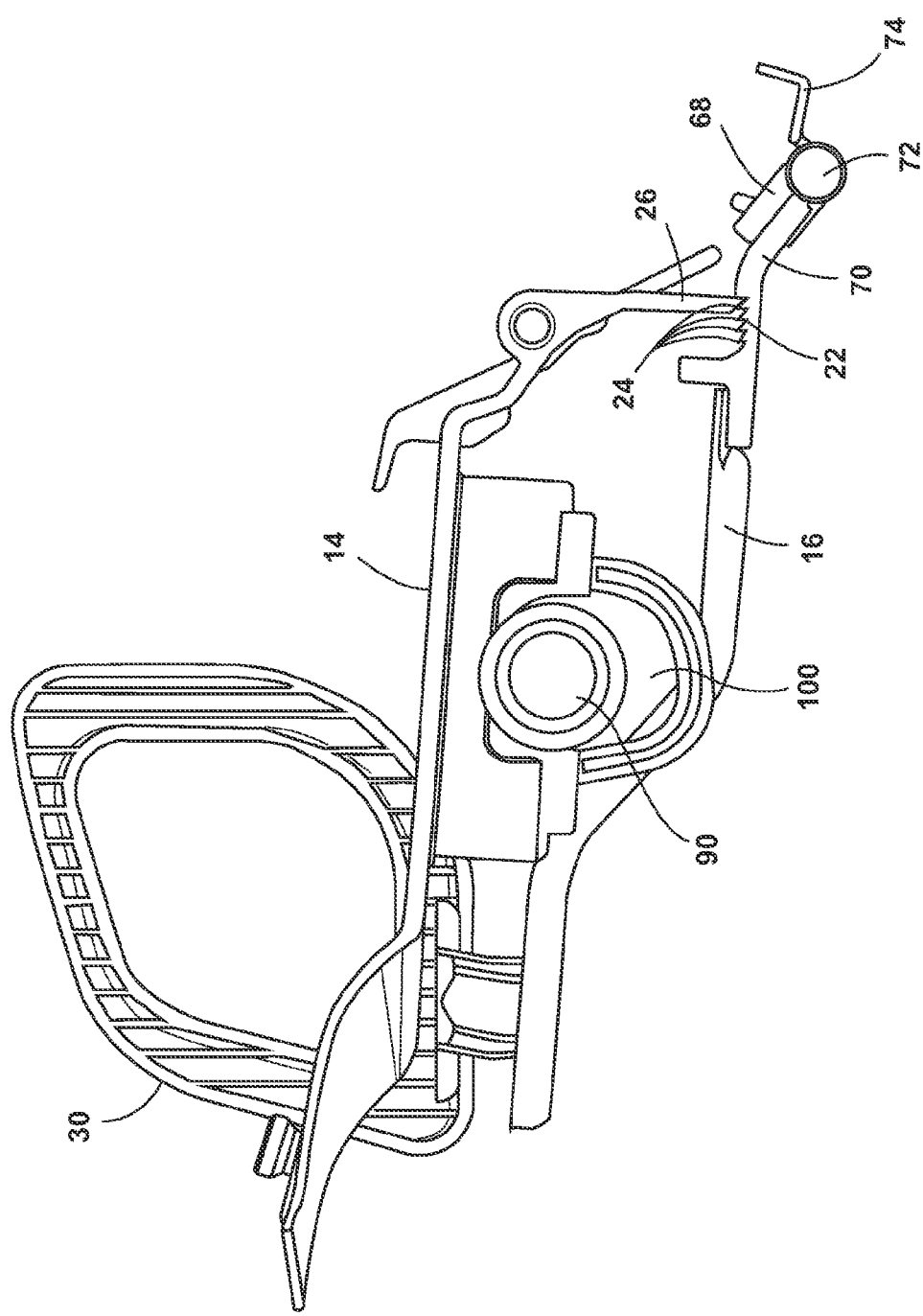
FIG. 7 is a side cross-sectional perspective view of one embodiment of a thigh support of a vehicle seating assembly in a low position.
Figure 8:
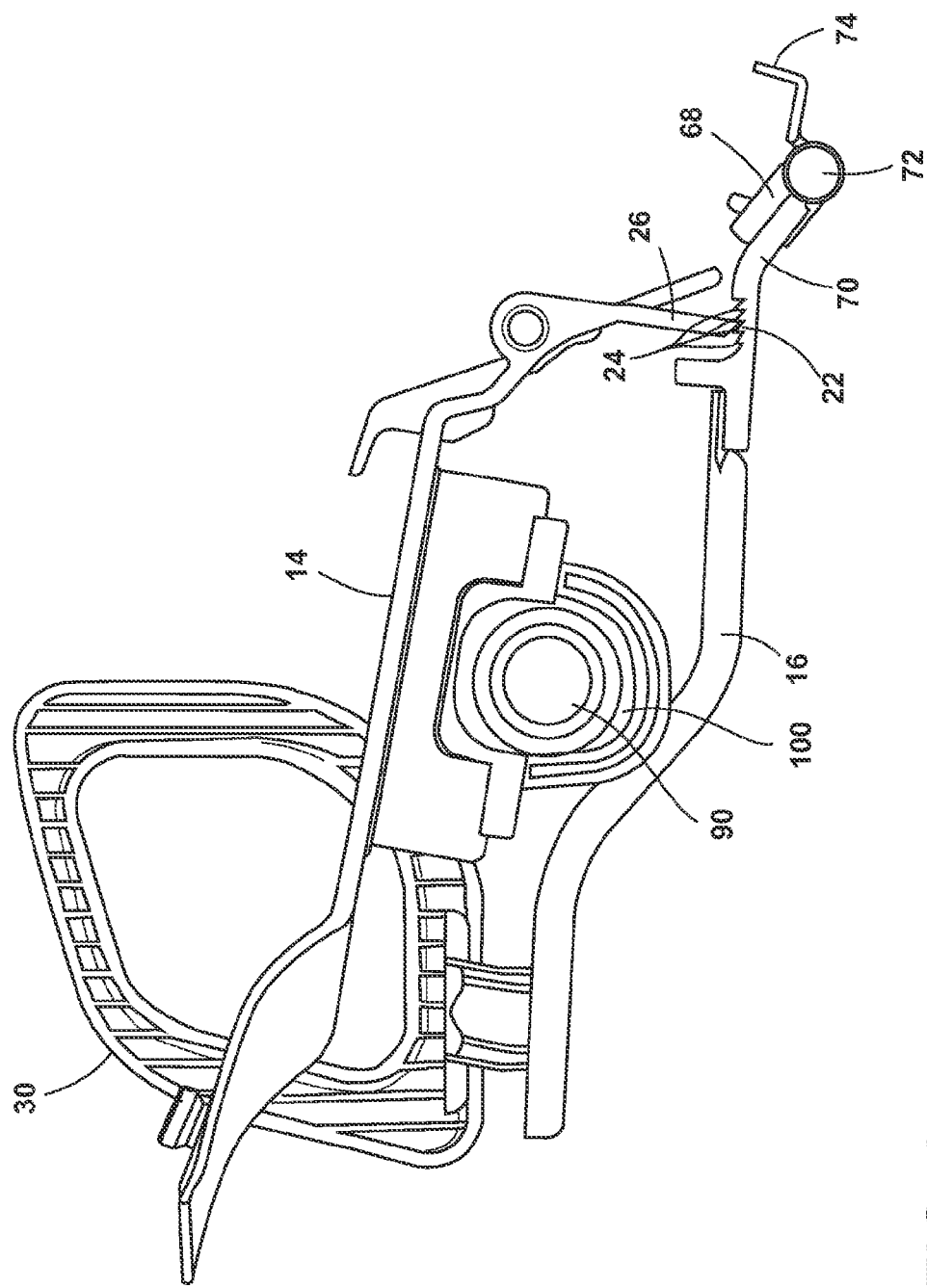
FIG. 8 is a side cross-sectional perspective view of one embodiment of a thigh support of a vehicle seating assembly in an intermediate position.
Figure 9:
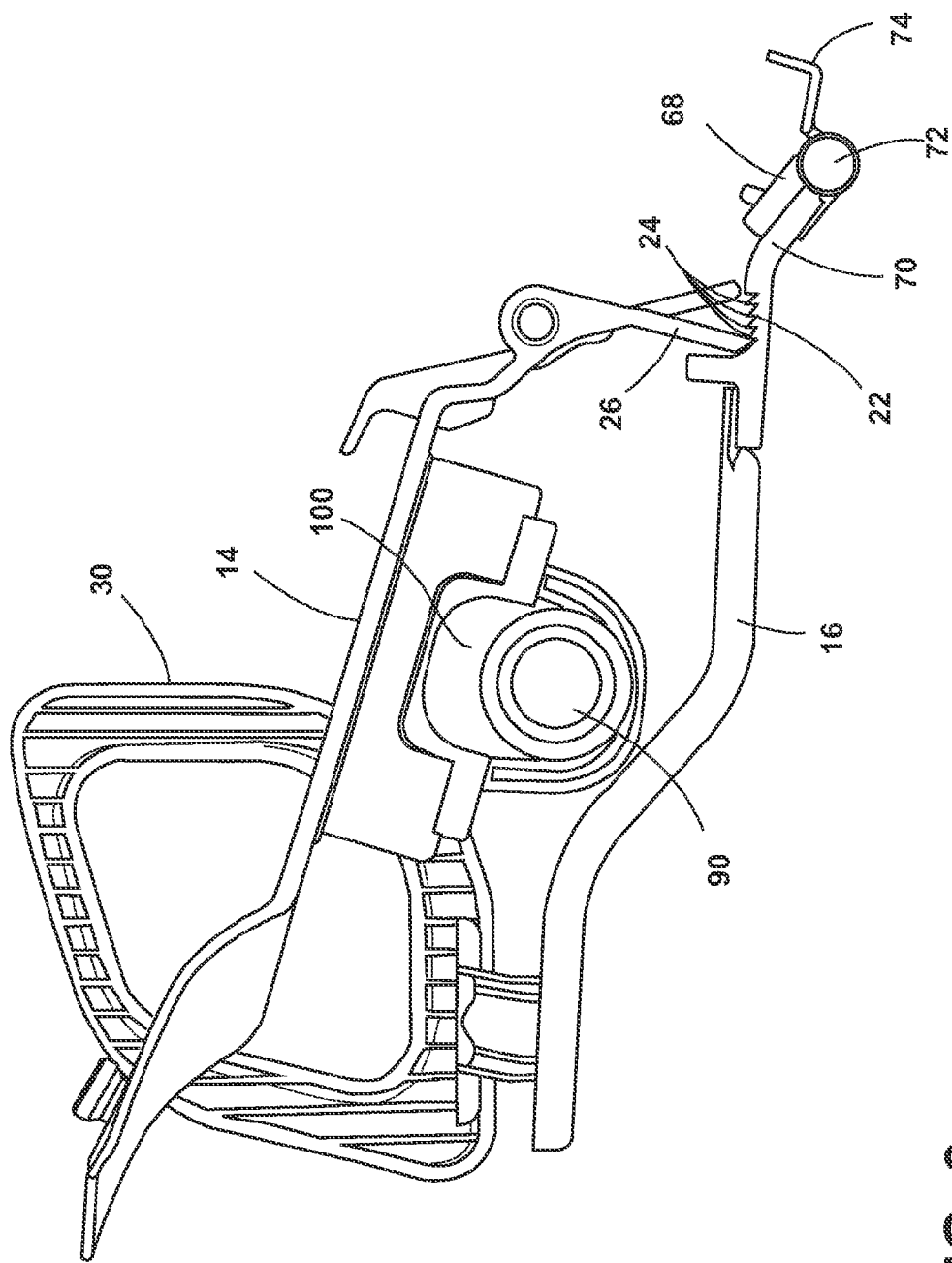
FIG. 9 is a side cross-sectional perspective view of one embodiment of a thigh support of a vehicle seating assembly in a high position.

With reference now to the embodiments depicted in FIGS. 7-9, various positions of the thigh support 14 are illustrated. Specifically, in FIG. 7, the catch 26 is in secure engagement with one of the teeth 24 that aligns the thigh support 14 at a zero degree incline or angle. Notably, the support rod 90 that is disposed under the thigh support 14 is in abutting contact or at least proximate to the braces 92 on the underside of the thigh support 14. To move the thigh support 14 to another comfort position, the handle 30 is forced downwardly by a passenger against the spring bias of the spring members 74 proximate the hinge pin 72. As the handle 30 is forced downward, the lever 16, and consequently the forward flange 70 of the piano-type hinge mechanism 66 rotates downward. A passenger can then apply downward force to the thigh support 14 to a six degree inclination (FIG. 8). The passenger then allows the handle 30 to move upwardly as a result of the spring bias of the spring members 74 and into secure engagement with the catch 26, thereby positioning the thigh support 14 in a desired position relative to the lever 16 and the rack 22. If further adjustment is desired, the handle 30 can then be forced downward once again. The passenger can then allow the thigh support 14 to raise again to a 12 degree inclination position (FIG. 9). Notably, the support rod 90 is now proximate the gaskets 96 and rigid bracket members 98 and generally distal from the braces 92 disposed on the bottom of the thigh support 14.

In the illustrated embodiment, the thigh support 14 may be moved between zero degrees, three degrees, six degrees, nine degrees, and 12 degrees. However, it is contemplated that any degree of adjustment may be available, and that the teeth 24 may be arranged in the rack 22 to accommodate varying degrees of adjustment. Further, it is contemplated that the degree change may even include declination to a position below zero degrees or inclination above 12 degrees.

The disclosure set forth herein describes a vehicle seating assembly that provides exceptional comfort to a passenger and independent control of support to each leg of a passenger. The vehicle seating assembly can be manually or automatically adjusted via a motor to accommodate passengers of various sizes and also create additional comfort for long travel. The versatility and the simplicity of the concepts noted above provide for a robust and durable vehicle seating assembly that can be manufactured at minimal costs.

It will also be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a seat base;
    a thigh support pivotally coupled to and extending forward from the seat base, the thigh support being spring-biased relative to the seat base to a raised position;
    a bracket member disposed under the thigh support and defining an enlarged opening through which a support rod extends, the bracket limiting vertical movement of the thigh support;
    a lever operably coupled to a center portion of the thigh support by a hinge, the lever being spring-biased to a raised position relative to the thigh support and including a rack with a plurality of teeth proximate the hinge, the teeth of the rack being configured to engage a catch projecting from the thigh support; and
    a handle extending transversely from the lever, the handle operable to disengage the rack from the catch.

2. The vehicle seating assembly of claim 1, wherein the thigh support is pivotally coupled to the seat base via a piano-type hinge mechanism.

3. The vehicle seating assembly of claim 2, further comprising:
    a hinge pin extending through the piano-type hinge mechanism; and
    springs disposed on opposing ends of the hinge pin.

4. The vehicle seating assembly of claim 1, wherein the teeth of the rack are configured to position the thigh support at an angle of 0, 3, 6, 9, and 12 degrees relative to the seat base.

5. The vehicle seating assembly of claim 1, wherein the lever includes a widened rear portion operably coupled to the hinge and a narrow forward portion coupled to the handle.

6. The vehicle seating assembly of claim 1, wherein the teeth of the rack extend laterally a distance approximately equal to a width of the hinge.

7. The vehicle seating assembly of claim 1, wherein the thigh support includes a lateral portion and a vertical portion, and wherein the vertical portion forms the catch.

8. A vehicle seating assembly comprising:
    a forward thigh support pivotally coupled to a seat base;
    a lever coupled to the thigh support via a hinge and having a plurality of teeth;
    first and second elongate catch members projecting downward from the thigh support and engaged with the teeth;
    spring members disposed on the hinge that bias the lever to a raised position; and a handle operable to disengage the teeth from the elongate catch members.

9. The vehicle seating assembly of claim 8, wherein the thigh support is pivotally coupled to the seat base via a piano-type hinge mechanism.

10. The vehicle seating assembly of claim 9, further comprising:
   a hinge pin extending through the piano-type hinge mechanism; and
   springs disposed on ends sides of the hinge pin, the springs biasing the lever to a raised position.

11. The vehicle seating assembly of claim 8, wherein the teeth are configured to position the thigh support at an angle between 0 and 12 degrees relative to the seat base.

12. The vehicle seating assembly of claim 8, wherein the lever includes a widened rear portion operably coupled to the hinge and a narrow forward portion coupled to the handle.

13. The vehicle seating assembly of claim 8, wherein the teeth are disposed in a rack that extends laterally a distance approximately equal to a width of the hinge.

14. The vehicle seating assembly of claim 8, wherein the thigh support includes a lateral portion and a vertical portion, and wherein the vertical portion forms the catch.

15. A vehicle seating assembly comprising:
   a seat base;
   a forward thigh support pivotally coupled to the seat base, the thigh support being spring-biased to a raised position;
   a lever hingedly coupled to the thigh support and spring-biased to a raised position, the lever including teeth engaged with a catch projecting from the seat base; and
   a handle extending from the lever and operable to disengage the teeth from the catch, wherein the teeth are disposed in a rack that extends laterally a distance approximately equal to a width of a hinge.

16. The vehicle seating assembly of claim 15, wherein the teeth are configured to position the thigh support at an angle between 0 and 12 degrees relative to the seat base.

17. The vehicle seating assembly of claim 15, wherein the lever includes a widened rear portion operably coupled to a hinge and a narrow forward portion coupled to the handle.

18. The vehicle seating assembly of claim 17, wherein the widened rear portion is operably coupled to the narrow forward portion via an angled transitional portion.

19. The vehicle seating assembly of claim 15, wherein the rack includes a stop at a forward portion thereof that limits over rotation of the catch.

* * * * *